US012243448B2

(12) United States Patent
Lee et al.

(10) Patent No.: US 12,243,448 B2
(45) Date of Patent: Mar. 4, 2025

(54) FLEXIBLE DISPLAY DEVICE HAVING SUPPORTING LAYER

(71) Applicant: E Ink Holdings Inc., Hsinchu (TW)

(72) Inventors: Kuo Chang Lee, Hsinchu (TW); Yi-Sheng Lin, Hsinchu (TW); Chen-Chu Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 182 days.

(21) Appl. No.: 17/582,005

(22) Filed: Jan. 24, 2022

(65) Prior Publication Data

US 2022/0343807 A1 Oct. 27, 2022

(30) Foreign Application Priority Data

Apr. 23, 2021 (TW) ................................ 110114703

(51) Int. Cl.
*G06F 1/16* (2006.01)
*G09F 9/30* (2006.01)

(52) U.S. Cl.
CPC .................................. *G09F 9/301* (2013.01)

(58) Field of Classification Search
CPC ............................. G06F 1/1652; G09F 9/301
See application file for complete search history.

(56) References Cited

U.S. PATENT DOCUMENTS 9,741,772 B2 8/2017 Yang et al.
9,983,424 B2 * 5/2018 Kim ..................... G06F 1/1624
10,164,208 B2 12/2018 Lee et al.
10,248,163 B2 * 4/2019 Luan ..................... G06F 1/1652
10,268,238 B2 4/2019 Hamburgen et al.
10,345,856 B2 7/2019 Song
10,411,084 B2 9/2019 Yeo
10,439,017 B2 10/2019 Kim et al.
10,514,724 B2 12/2019 Hamburgen et al.
10,582,612 B2 * 3/2020 Kwon ................... G06F 1/1626
10,602,631 B2 3/2020 Song et al.
10,694,625 B2 * 6/2020 Park ..................... H10K 59/871
10,831,234 B1 * 11/2020 Watamura ............. G06F 1/1652
(Continued)

FOREIGN PATENT DOCUMENTS

CN 110874988 A 3/2020
CN 111295870 A 6/2020
(Continued)

OTHER PUBLICATIONS

The office action of corresponding CN application No. 202210080445.X issued on Nov. 14, 2023.
(Continued)

*Primary Examiner* — Rockshana D Chowdhury
*Assistant Examiner* — Douglas R Burtner
(74) *Attorney, Agent, or Firm* — CKC & Partners Co., LLC

(57) ABSTRACT

A flexible display device includes a supporting layer and a flexible display panel. The supporting layer has two non-folding regions and a folding region between the two non-folding regions. The folding region has a central region and two edge regions. Each of the edge regions is located between one of the two non-folding regions and the central region, and open porosities of the two edge regions are different from an open porosity of the central region. The flexible display panel is located on the supporting layer.

13 Claims, 9 Drawing Sheets

(56) References Cited

U.S. PATENT DOCUMENTS

| | | | | |
|---|---|---|---|---|
| 11,061,445 | B2 * | 7/2021 | Kim | H04M 1/022 |
| 11,343,909 | B2 * | 5/2022 | Koo | H05K 1/0306 |
| 11,656,655 | B2 * | 5/2023 | Shin | G06F 1/1643 361/679.27 |
| 11,662,780 | B2 * | 5/2023 | Park | G06F 1/1616 361/679.01 |
| 11,703,632 | B2 * | 7/2023 | Wen | G02B 6/0081 361/679.02 |
| 11,907,019 | B2 * | 2/2024 | Soh | G06F 1/1652 |
| 11,908,349 | B2 * | 2/2024 | Zhao | G06F 1/1652 |
| 11,977,413 | B2 * | 5/2024 | Naito | G06F 1/1652 |
| 12,011,907 | B2 * | 6/2024 | Park | G06F 1/1652 |
| 12,093,082 | B2 * | 9/2024 | Park | G06F 1/1652 |
| 2016/0190216 | A1 | 6/2016 | Yang et al. | |
| 2018/0103552 | A1 * | 4/2018 | Seo | H05K 5/0017 |
| 2018/0153049 | A1 | 5/2018 | Song et al. | |
| 2018/0190936 | A1 * | 7/2018 | Lee | B32B 3/18 |
| 2018/0356859 | A1 | 12/2018 | Hamburgen et al. | |
| 2019/0324498 | A1 | 10/2019 | Hamburgen et al. | |
| 2020/0212325 | A1 | 7/2020 | Seo | |
| 2021/0352814 | A1 * | 11/2021 | Park | G06F 1/1652 |
| 2022/0149337 | A1 * | 5/2022 | Horiuchi | H10K 71/00 |
| 2022/0183174 | A1 * | 6/2022 | Bae | B32B 3/266 |
| 2022/0199922 | A1 * | 6/2022 | Choi | H10K 77/111 |
| 2022/0209145 | A1 * | 6/2022 | Kim | B32B 15/06 |
| 2023/0111654 | A1 * | 4/2023 | Li | G09F 9/301 361/807 |
| 2023/0114378 | A1 * | 4/2023 | Han | G06F 1/1641 361/679.27 |
| 2023/0156934 | A1 * | 5/2023 | Jiang | H05K 5/0217 361/807 |
| 2023/0354533 | A1 * | 11/2023 | Fu | G09F 9/301 |

FOREIGN PATENT DOCUMENTS

| | | | |
|---|---|---|---|
| CN | 111508357 | A | 8/2020 |
| CN | 111798751 | A | 10/2020 |
| CN | 212010180 | U | 11/2020 |
| CN | 110335546 | B | 3/2021 |
| TW | I598234 | B | 9/2017 |
| TW | 201807471 | A | 3/2018 |
| TW | 201818125 | A | 5/2018 |
| TW | I696012 | B | 6/2020 |
| TW | 202104999 | A | 2/2021 |
| WO | 9947969 | A1 | 9/1999 |

OTHER PUBLICATIONS

Corresponding Taiwan office action issued on Dec. 28, 2021.
The office action of corresponding TW application No. 111102916 issued on Nov. 4, 2022.

* cited by examiner

FLEXIBLE DISPLAY DEVICE HAVING SUPPORTING LAYER

RELATED APPLICATIONS

This application claims priority to Taiwan Application Serial Number 110114703, filed Apr. 23, 2021, which is herein incorporated by reference.

BACKGROUND

Field of Invention

The present disclosure relates to a flexible display device.

Description of Related Art

In the current market of various consumer electronic products, flexible display devices have been developed, such as electronic paper devices. Their display medium layer is mainly composed of electrophoresis liquid and charged particles mixed in the electrophoresis liquid. Through applying a voltage to the display medium layer, the charged particles can be driven to move in an opposite direction, so that the pixel areas display a bright surface or a dark surface respectively. Because the flexible display device utilizes incident light to irradiate the display medium layer to achieve the display purpose, and the incident light can be sunlight or indoor ambient light, it does not need a backlight and can save power consumption.

The flexible display device not only includes a flexible display panel with a display medium layer, but also has a supporting layer used for attaching to the back of the flexible display panel. Generally speaking, the supporting layer needs to have a low-stiffness folding region and a high-stiffness non-folding region to provide folding and supporting functions for the flexible display panel, respectively. However, owing to the sudden change of stiffness in the folding region and non-folding region, creases tend to appear at the edge of the folding region when the panel is folded. In addition, the folding region of the traditional supporting layer does not have a special design, which is easy to cause uneven internal stress during bending and poor writing feeling of the touch pen.

SUMMARY

One aspect of the present disclosure provides a flexile display device.

According to an embodiment of the present disclosure, a flexible display device includes a supporting layer and a flexible display panel. The supporting layer has two non-folding regions and a folding region between the two non-folding regions. The folding region has a central region and two edge regions. Each of the edge regions is located between one of the two non-folding regions and the central region, and open porosities of the two edge regions are different from an open porosity of the central region. The flexible display panel is located on the supporting layer.

In the foregoing, the open porosity of each of the edge regions is less than the open porosity of the central region.

In the foregoing, the open porosities of the two edge regions gradually increase from the two non-folding regions towards the central region.

In the foregoing, the central region has a plurality of first openings. Each of the edge regions has a plurality of second openings. A length of the second openings is smaller than a length of the first openings, and the length of the second openings gradually decreases from the central region towards one of the two non-folding regions.

In the foregoing, the central region has a plurality of first openings. Each of the edge regions has a plurality of second openings. A width of the second openings is smaller than a width of the first openings, and the width of the second openings gradually decreases from the central region towards one of the two non-folding regions.

In the foregoing, the central region has a plurality of first openings. Each of the edge regions has a plurality of second openings, and a shape of the first openings is different from a shape of the second openings.

In the foregoing, the first openings are in a shape of a rectangle. The second openings are is in a shape of a rhombus.

In the foregoing, the central region has a plurality of first openings. Each of the edge regions has a plurality of second openings. A distance between two adjacent second openings in a direction is greater than a distance between two adjacent first opening in the direction, and the distance between the two adjacent second openings in the direction gradually increases from the central region towards one of the two non-folding regions.

In the foregoing, the folding region has a bending axis. The direction is a direction perpendicular to the bending axis.

In the foregoing, the folding region has a bending axis. The direction is a direction parallel to the bending axis.

In the foregoing, the two non-folding regions have no opening.

In the foregoing, the central region has a plurality of first openings, and each of the first openings is misaligned with the adjacent first opening along a lengthwise direction of the supporting layer.

In the foregoing, the central region has a plurality of first openings, and the first openings are arranged in an oblique direction.

In the above embodiments of the present disclosure, since the folding region of the supporting layer has the central region and the two edge regions, and the open porosities of the two edge regions are different from the open porosity of the central region, a gradient design of mechanical stiffness can be realized. As a result, the sudden change in the stiffness of the edge regions of the folding region can be reduced, and the flexible display panel on the supporting layer can be prevented from generating creases.

Another aspect of the present disclosure provides a flexile display device.

According to an embodiment of the present disclosure, a flexible display device includes a supporting layer and a flexible display panel. The supporting layer has two non-folding regions and a folding region between the two non-folding regions. The folding region has a bending axis and a plurality of openings. Each of the openings has different sizes in a direction perpendicular to the bending axis. The flexible display panel is located on the supporting layer.

In the foregoing, the openings in the folding region are in a shape of a Z, in a shape of a cross, in a shape of a rhombus, or in a shape of an ellipse.

In the foregoing, each of the openings in the folding region has a body region and an extension region. A lengthwise direction of the body region is parallel to the bending axis, and the extension region extends from the body region towards the direction perpendicular to the bending axis.

In the foregoing, the extension region is communicated with an end or a central portion of the body region.

In the foregoing, two adjacent openings in the direction perpendicular to the bending axis have two corresponding positions. A size of the extension region communicated with the end of the body region is smaller than a distance between the two corresponding positions.

In the foregoing, the extension region and the end of the body region are at a right angle or at an obtuse angle.

In the foregoing, the extension region communicated with the end of the body region is in a shape of an arc or in a shape of an L.

In the foregoing, the openings in the folding region are in a shape of a rhombus. An apex angle of each of the openings is in a range from 1 degree to 15 degree. A distance between two adjacent openings in the direction perpendicular to the bending axis is in a range from 200 μm to 2 cm.

In the foregoing, the openings in the folding region are in a shape of a rhombus. A distance between two adjacent openings in the direction perpendicular to the bending axis gradually increases from the bending axis towards the two non-folding regions.

In the above embodiments of the present disclosure, since the folding region has the bending axis and the openings and each of the openings has the different sizes in the direction perpendicular to the bending axis, each of the openings will have laterally extension regions. As a result, the length of the arm of each of the unopened regions in the folding region can be shortened to increase the external force required to generate torsion. When using a touch pen to write on the flexible display panel, the degree of twisting of the unopened regions can be reduced to improve the writing feeling. Additionally, the above design of the openings can further shorten a lateral distance between two adjacent openings, and the internal stress can be effectively diffused to improve the uniformity of stress distribution and prevent the flexible display panel from generating creases.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
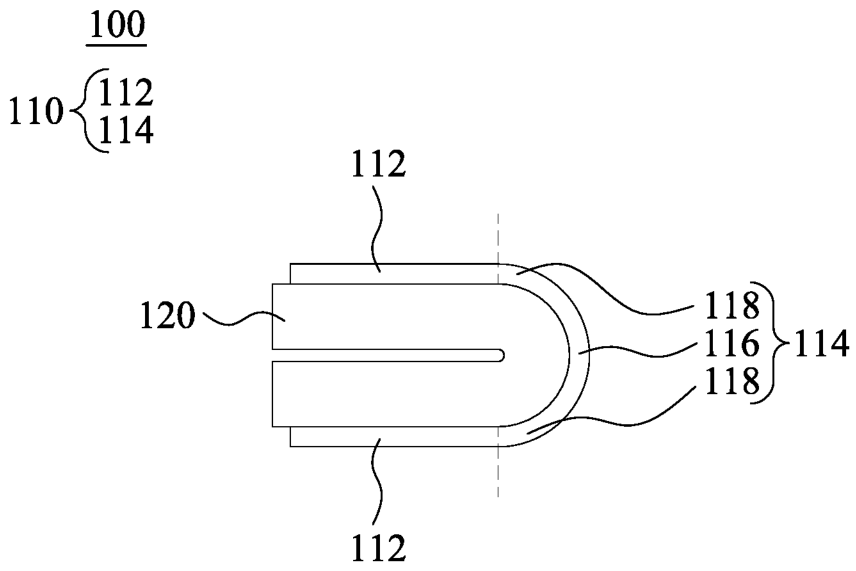
FIG. 1 depicts a side view of a flexible display device when being folded according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Throughout the discussion herein, unless otherwise specified, the same or similar numbers in different drawings represent the same or similar elements formed by the same or similar forming methods using the same or similar materials.

Figure 2:
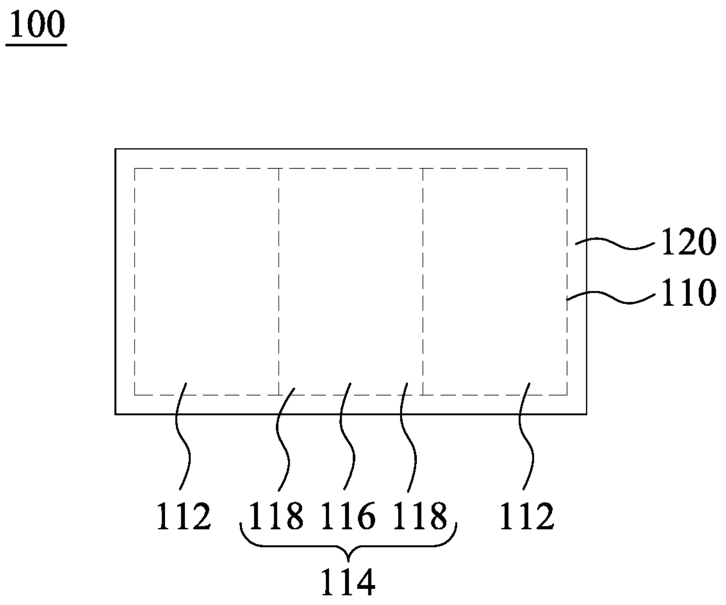
FIG. 2 depicts a top view of the flexible display device in FIG. 1 when being flattened.

FIG. 1 depicts a side view of a flexible display device 100 when being folded according to one embodiment of the present disclosure. FIG. 2 depicts a top view of the flexible display device 100 in FIG. 1 when being flattened. A description is provided with reference to FIG. 1 and FIG. 2. The flexible display device 100 includes a supporting layer 110 and a flexible display panel 120. The flexible display panel 120 is located on the supporting layer 110. The supporting layer 110 has two non-folding regions 112 and a folding region 114 between the two non-folding regions 112. The supporting layer 110 may be a metal plate (such as an aluminum plate), and the flexible display panel 120 may be an electronic paper. However, the present disclosure is not limited in this regard. The flexible display panel 120 may include a thin film transistor array substrate and a front panel, and the front panel has a display medium layer and a transparent substrate. When the flexible display device 100 is folded, the folding region 114 of the supporting layer 110 is configured to bend with the flexible display panel 120. When the flexible display device 100 is flattened, the supporting layer 110 has sufficient rigidity to support the flexible display panel 120, and the non-folding regions 112 are configured to allow a user to press and write on the flexible display panel 120 on them by using a finger or a touch pen. In the following description, various embodiments of the folding region 114 of the supporting layer 110 are explained.

FIG. 3 to FIG. 9 depict top views of the supporting layer 110 and supporting layers 110*a*-110*f* according to various embodiments of the present disclosure. The supporting layers 110*a*-110*f* can replace the supporting layer 110 of FIG. 1 and FIG. 2, and that must be explained first. A description is provided with reference to FIG. 3. The folding region 114 of the supporting layer 110 has a central region 116 and two edge regions 118. The edge region 118 is located between the non-folding region 112 and the central region 116, and open porosities of the edge regions 118 are different from an open porosity of the central region 116. For example, the open porosities of the two edge regions 118 are less than the open porosity of the central region 116. In addition, the two non-folding regions 112 have no opening, so open porosities of the non-folding regions 112 are less than the opening porosities of the edge regions 118 of the folding region 114. Through the above configuration, stiffness of the edge regions 118 of the folding region 114 are higher than stiffness of the central region 116, but lower than stiffness of the non-folding regions 112, which has the effect of distributing stress.

Since the folding region 114 of the supporting layer 110 has the central region 116 and the two edge regions 118, and the open porosities of the two edge regions 118 are different from the open porosity of the central region 116, a gradient design of mechanical stiffness can be realized. In this manner, the sudden change in the stiffness of the edge regions 118 of the folding region 114 can be reduced, and the flexible display panel 120 (see FIG. 1 and FIG. 2) on the supporting layer 110 can be prevented from generating creases.

In the present embodiment, the central region 116 has a plurality of first openings O1. Each of the edge regions 118 has a plurality of second openings O2. A length of the second openings O2 is smaller than a length of the first openings O1, and the length of the second openings O2 gradually decreases from the central region 116 towards the non-folding regions 112. The configuration of the first openings O1 and the second openings O2 makes the folding region 114 of the supporting layer 110 have a bendable characteristic.

Additionally, each of the edge regions 118 has multiple columns of the second openings O2, and the length of the second openings O2 gradually decreases from the central region 116 towards the non-folding regions 112. As a result, the open porosities of the edge regions 118 can gradually decrease from the central region 116 towards the non-folding regions 112.

In the present embodiment, each of the first openings O1 and the second openings O2 is in a shape of an ellipse. The length of the first openings O1 and the length of the second openings O2 may be less than 30 mm, less 15 mm, less than 5 mm, or even less than 1 mm.

It should be understood that the connection relationships, materials, and effects of the components that have been described will not be repeated, and that must be explained first. In the following description, other forms of supporting layers are illustrated.

Figure 3:
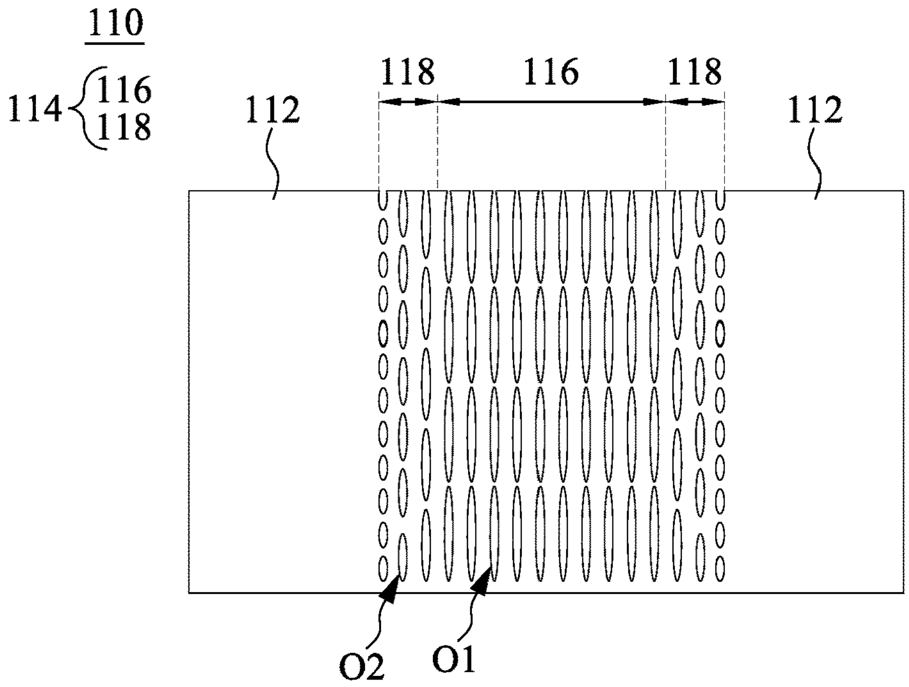
FIG. 3 to FIG. 9 depict top views of supporting layers according to various embodiments of the present disclosure.
Figure 4:
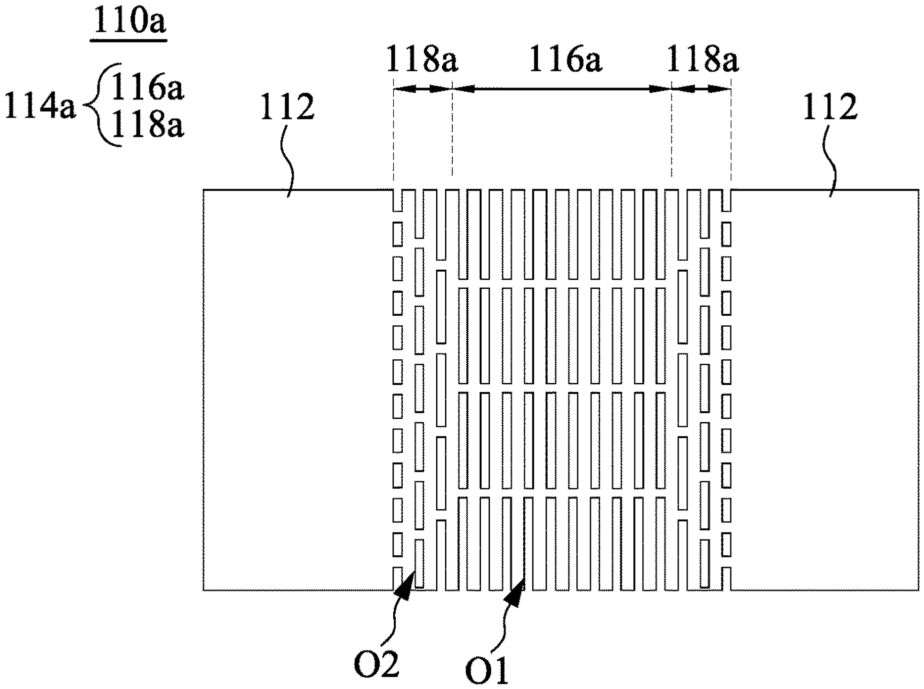

A description is provided with reference to FIG. 4. A folding region 114*a* of a supporting layer 110*a* has a central region 116*a* and two edge regions 118*a*. A difference between the present embodiment and the embodiment of FIG. 3 lies in that each of the first openings O1 and the second openings O2 is in a shape of a rectangle. Each of the edge regions 118 has multiple columns of the second openings O2, and the length of the second openings O2 gradually decreases from the central region 116 towards the non-folding regions 112. As a result, open porosities of the edge regions 118*a* can gradually decrease from the central region 116*a* towards the non-folding regions 112. This configuration can reduce the sudden change in stiffness of the edge regions 118*a* of the folding region 114*a*, and prevent the flexible display panel 120 (see FIG. 1 and FIG. 2) on the supporting layer 110*a* from generating creases.

Figure 5:
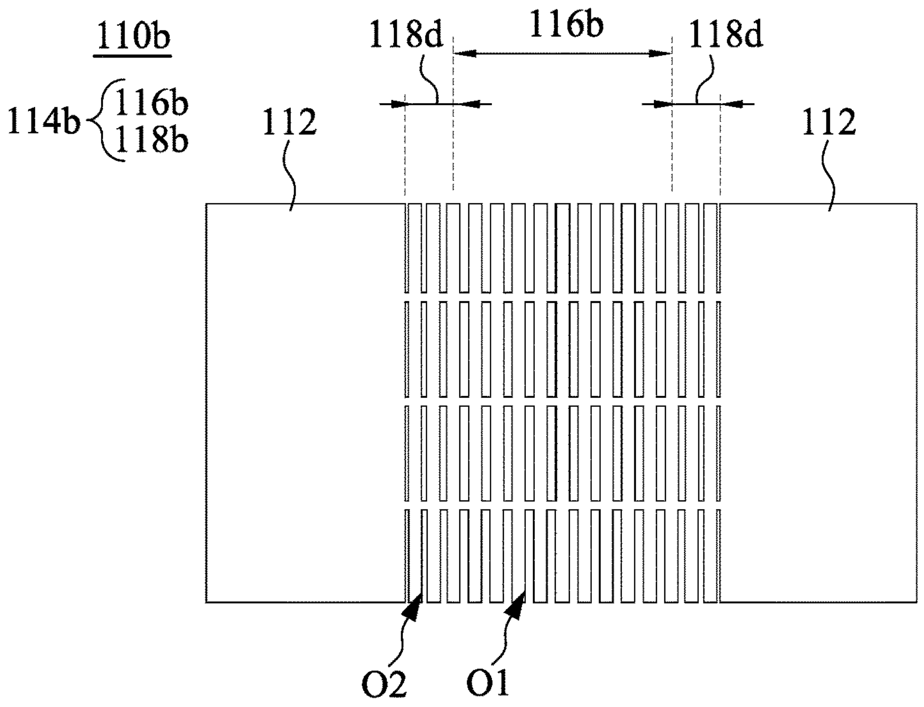

A description is provided with reference to FIG. 5. A folding region 114*b* of a supporting layer 110*b* has a central region 116*b* and two edge regions 118*b*. A difference between the present embodiment and the embodiment of FIG. 4 lies in that the length of the first openings O1 is the same as the length of the second openings O2, a width of the second openings O2 is smaller than a width of the first openings O1, and the width of the second openings O2 gradually decreases from the central region 116*b* towards the non-folding regions 112. In addition to that, each of the edge regions 118*b* has multiple columns of the second openings O2, and the width of the second openings O2 gradually becomes narrower from the central region 116*a* towards the non-folding regions 112. As a result, open porosities of the edge regions 118*b* can gradually decrease from the central region 116*b* towards the non-folding regions 112. This configuration can reduce the sudden change in stiffness of the edge regions 118*b* of the folding region 114*b*, and prevent the flexible display panel 120 (see FIG. 1 and FIG. 2) on the supporting layer 110*b* from generating creases. In the present embodiment, the width of the first openings O1 and the width of the second openings O2 may be less than 500 μm, less 300 μm, less than 100 μm, or even less than 50 μm.

Figure 6:
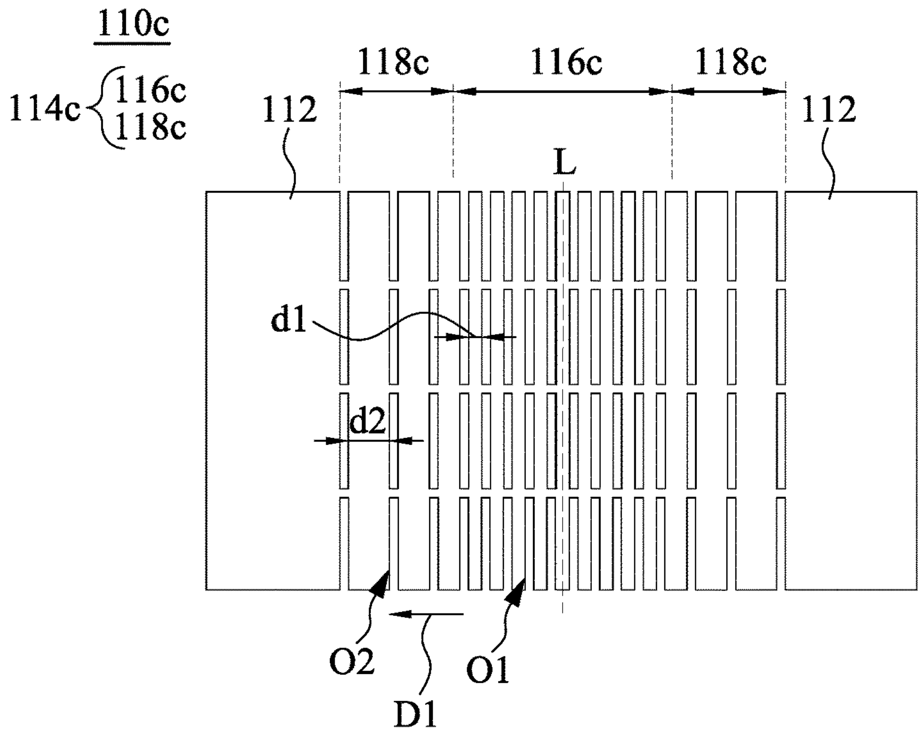

A description is provided with reference to FIG. 6. A folding region 114*c* of a supporting layer 110*c* has a central region 116*c* and two edge regions 118*c*. The folding region 114*c* has a bending axis L, which may be a symmetry axis of the folding region 114*c*. A difference between the present embodiment and the embodiment of FIG. 5 lies in that the width of the first openings O1 is the same as the width of the second openings O2, a distance d2 between two adjacent second openings O2 in a direction D1 perpendicular to the bending axis L is greater than a distance d1 between two adjacent first opening O1 in the direction D1, and the distance d2 between the two adjacent second openings O2 in the direction D1 gradually increases from the central region 116*c* towards the non-folding regions 112. As a result, open porosities of the edge regions 118*c* can gradually decrease from the central region 116*c* towards the non-folding regions 112. This configuration can reduce the sudden change in stiffness of the edge regions 118*c* of the folding region 114*c*, and prevent the flexible display panel 120 (see FIG. 1 and FIG. 2) on the supporting layer 110*c* from generating creases. In the present embodiment, the distance d1 and the distance d2 may be more than 0.05 mm, more than 0.3 mm, more than 0.5 mm, or even more than 1 mm.

Figure 7:
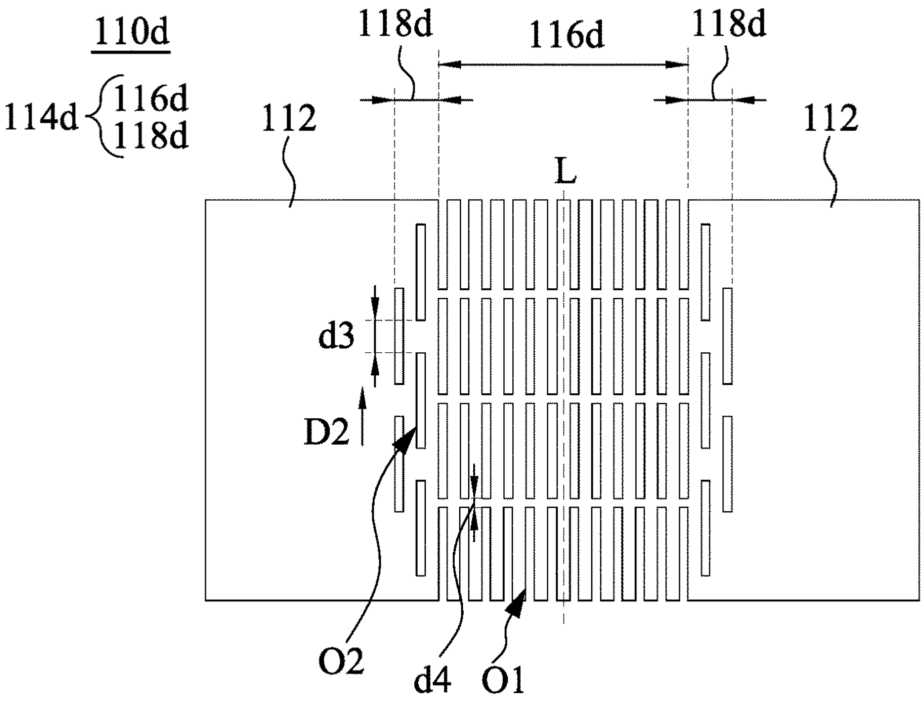

A description is provided with reference to FIG. 7. A folding region 114*d* of a supporting layer 110*d* has a central region 116*d* and two edge regions 118*d*. The folding region 114*d* has the bending axis L, which may be a symmetry axis of the folding region 114*d*. A difference between the present embodiment and the embodiment of FIG. 5 lies in that the width of the first openings O1 is the same as the width of the second openings O2, a distance d3 between two adjacent second openings O2 in a direction D2 parallel to the bending axis L is greater than a distance d4 between two adjacent first openings O1 in the direction D2, and the distance d3 between the two adjacent second openings O2 in the direction D2 gradually increases from the central region 116*d* towards the non-folding regions 112. As a result, open porosities of the edge regions 118*d* can gradually decrease from the central region 116*d* towards the non-folding regions 112. This configuration can reduce the sudden change in stiffness of the edge regions 118*d* of the folding region 114*d*, and prevent the flexible display panel 120 (see FIG. 1 and FIG. 2) on the supporting layer 110*d* from generating creases.

Figure 8:
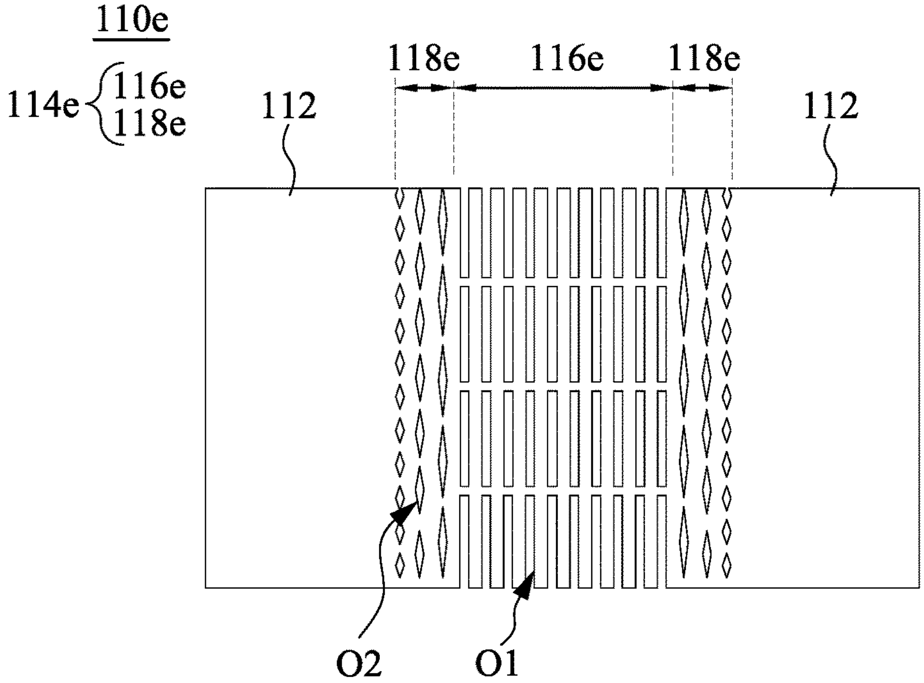

A description is provided with reference to FIG. 8. A folding region 114*e* of a supporting layer 110*e* has a central region 116*e* and two edge regions 118*e*. A difference between the present embodiment and the embodiment of FIG. 4 lies in that a shape of the first openings O1 is different from a shape of the second openings O2 in the edge regions 118*e*. The first openings O1 in the central region 116*e* are in a shape of a rectangle, and the second openings O2 in the edge regions 118*e* are in a shape of a rhombus. As a result, open porosities of the edge regions 118*e* can gradually decrease from the central region 116*e* towards the non-folding regions 112. This configuration can reduce the sudden change in stiffness of the edge regions 118*e* of the folding region 114*e*, and prevent the flexible display panel 120 (see FIG. 1 and FIG. 2) on the supporting layer 110*e* from generating creases.

Figure 9:
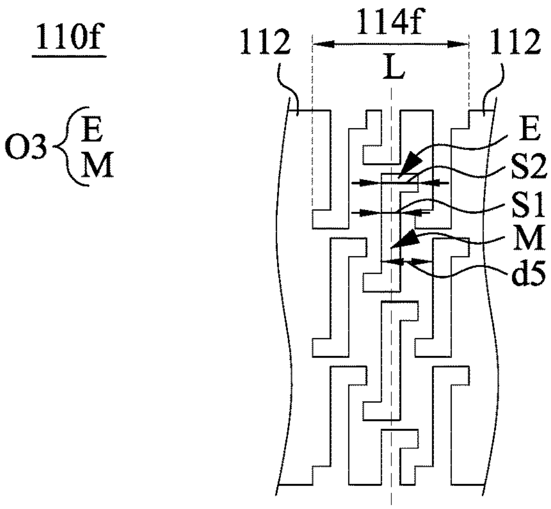
Figure 10:
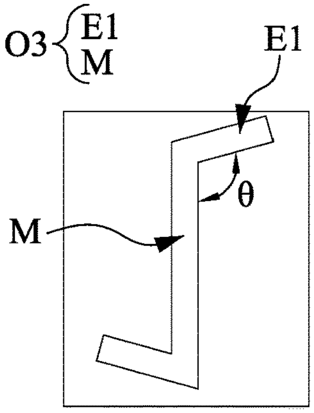
FIG. 10 to FIG. 13 depict top views of openings according to various embodiments of the present disclosure.

A description is provided with reference to FIG. 9. A supporting layer 110*f* has two non-folding regions 112 and a folding region 114*f* between the two non-folding regions 112. The folding region 114*f* has the bending axis L and a plurality of openings O3. Each of the openings O3 has different sizes in a direction perpendicular to the bending axis L (such as the horizontal direction). The opening O3 has a size S1 and a size S2 different from each other in the direction perpendicular to the bending axis L, for example, the size S1 is smaller than the size S2. In the present embodiment, the openings O3 in the folding region 114*f* are in a shape of a Z. In other embodiments, the openings O3 may be in a shape of a cross, in a shape of a rhombus, or in a shape of an ellipse.

Each of the openings O3 in the folding region 114*f* has a body region M and extension regions E. A lengthwise direction of the body region M is parallel to the bending axis L, and the extension regions E extend from the body region M towards the direction perpendicular to the bending axis L. The extension regions E of the opening O3 are communicated with ends of the body region M. The extension regions E and the ends of the main region M are at a right angle. In addition, in the present embodiment, two adjacent openings O3 in the direction perpendicular to the bending axis L have two corresponding positions, and the size S2 of the extension regions E communicated with the ends of the body region M is smaller than a distance d5 between the two corresponding positions. A difference between the distance d5 and the size S2 may be less than 1 mm, less than 0.5 mm, or even less than 0.2 mm.

Since the folding region 114*f* has the bending axis L and the openings O3 and each of the openings O3 has the different sizes in the direction perpendicular to the bending axis L, each of the openings O3 will have laterally extension regions. As a result, the length of the arm of each of the unopened regions in the folding region 114*f* can be shortened to increase the external force required to generate torsion. When using a touch pen to write on the flexible display panel 120 (see FIG. 1 and FIG. 2), the degree of twisting of the unopened regions can be reduced to improve the writing feeling. Additionally, the above design of the openings O3 can further shorten a lateral distance between two adjacent openings O3, and the internal stress can be effectively diffused to improve the uniformity of stress distribution and prevent the flexible display panel 120 from generating creases.

FIG. 10 to FIG. 13 depict top views of the openings O3 according to various embodiments of the present disclosure. The openings O3 in FIG. 10 to FIG. 13 can replace the opening O3 in FIG. 9. A description is provided with reference to FIG. 10. The opening O3 has the body region M and extension regions E1. A difference between the present embodiment and the embodiment of FIG. 9 lies in that the extension regions E1 and ends of the main region M are at an obtuse angle θ.

Figure 11:
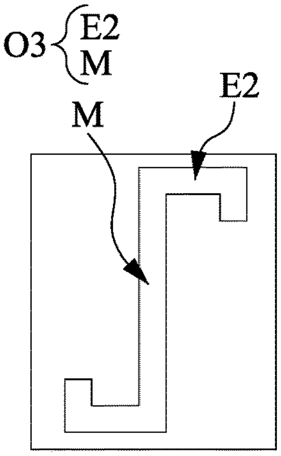

A description is provided with reference to FIG. 11. The opening O3 has the body region M and extension regions E2. A difference between the present embodiment and the embodiment of FIG. 9 lies in that the extension regions E2 communicated with ends of the body region M are in a shape of an L.

Figure 12:
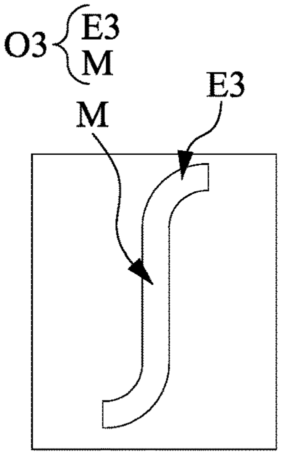

A description is provided with reference to FIG. 12. The opening O3 has the body region M and extension regions E3. A difference between the present embodiment and the embodiment of FIG. 9 lies in that the extension regions E3 communicated with ends of the body region M are in a shape of an arc.

Figure 13:
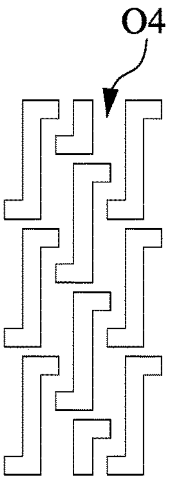

A description is provided with reference to FIG. 13. In another embodiment, positions of the unopened regions of the supporting layer 110*f* in FIG. 9 can be designed as openings O4, and positions of the openings O3 in the folding region 114*f* of FIG. 9 can be designed as unopened regions. The structure of FIG. 13 can thus be obtained.

Figure 14:
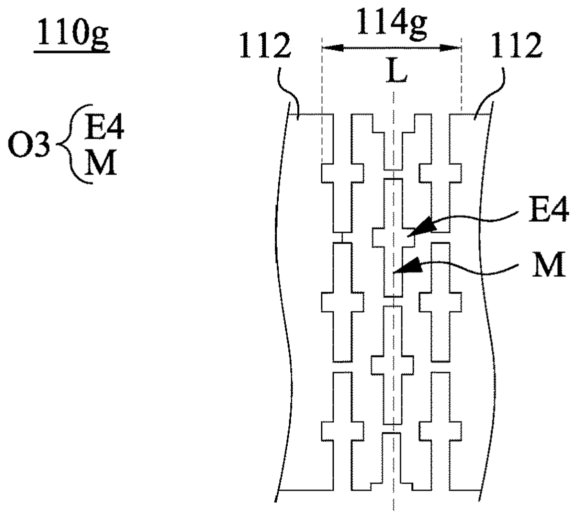
FIG. 14 to FIG. 15 depict top views of supporting layers according to various embodiments of the present discourse.
Figure 15:
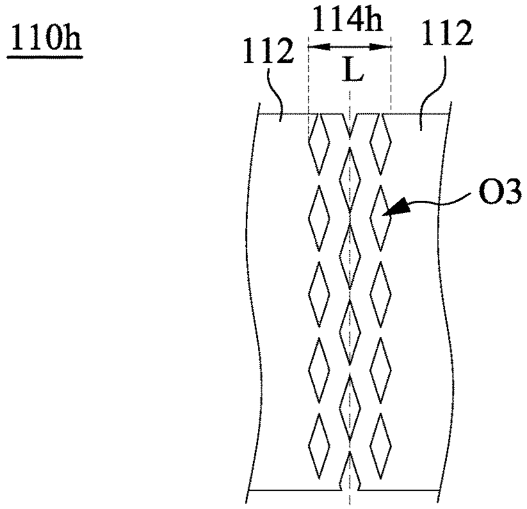

FIG. 14 to FIG. 15 depict top views of supporting layers 100*g*, 110*h* according to various embodiments of the present discourse. A description is provided with reference to FIG. 14. The supporting layer 110*g* has the two non-folding regions 112 and a folding region 114*g* between the two non-folding regions 112. The folding region 114*g* has the bending axis L and the openings O3. A difference between the present embodiment and the embodiment of FIG. 9 lies in that extension regions E4 of each of the openings O3 are communicated with a central portion of the body region M but not the ends of the body region M. With this configuration, the opening O3 can be in a shape of a cross.

A description is provided with reference to FIG. 15. The supporting layer 110*h* has the two non-folding regions 112 and a folding region 114*h* between the two non-folding regions 112. A difference between the present embodiment and the embodiment of FIG. 9 lies in that the openings O3 in the folding region 114*h* are in a shape of a rhombus.

Figure 16:
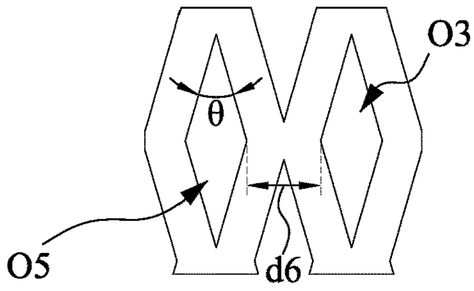
FIG. 16 depicts a partial enlarged view of the openings in FIG. 15.

FIG. 16 depicts a partial enlarged view of the openings O3 in FIG. 15. A description is provided with reference to FIG. 15 and FIG. 16. An apex angle θ1 of the rhombus is smaller than 15 degrees. For example, the apex angle θ1 of the opening O3 is in a range from 1 degree to 15 degrees. The folding region 114*h* has the bending axis L. A distance d6 between two adjacent openings O3 in the folding region 114*h* in a direction perpendicular to the bending axis L is smaller 2 cm, smaller than 1 cm, or even smaller than 500 μm. For example, the distance d6 is in a range from 200 μm to 2 cm.

Figure 17:
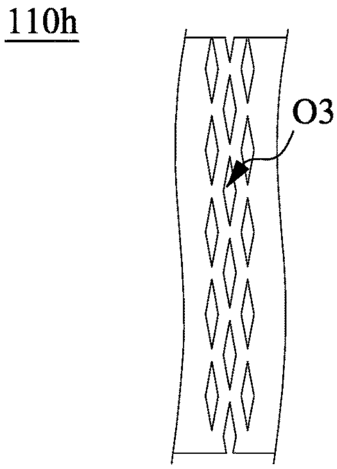
FIG. 17 depicts a top view of the supporting layer in FIG. 15 after being compressed.

FIG. 17 depicts a top view of the supporting layer 110*h* in FIG. 15 after being compressed. The supporting layer 110*h* has the rhombic openings O3, so that the supporting layer

110*h* can be attached to a back of the flexible display panel 120 (see FIG. 1 and FIG. 2) by using a lateral compression method.

Figure 18:
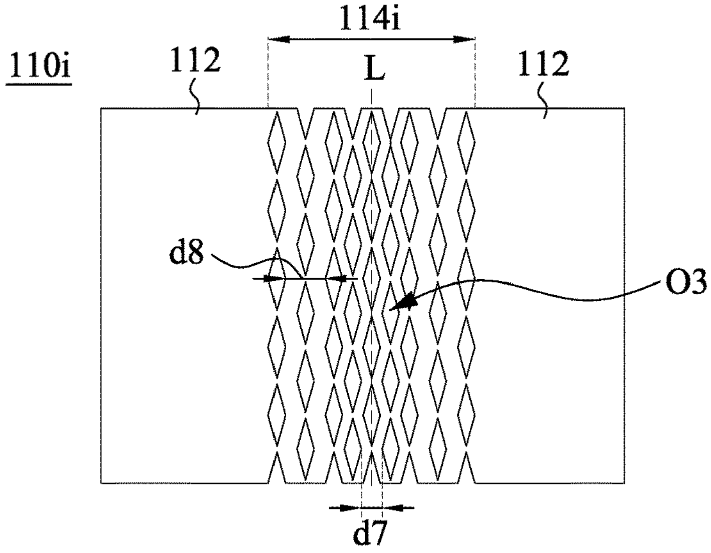
FIG. 18 depicts a top view of a supporting layer according to one embodiment of the present disclosure.

FIG. 18 depicts a top view of a supporting layer 110*i* according to one embodiment of the present disclosure. The supporting layer 110*i* has the two non-folding regions 112 and a folding region 114*i* between the two non-folding regions 112. The openings O3 in the folding region 114*i* are in a shape of a rhombus. A distance between two adjacent openings O3 in a direction perpendicular to the bending direction L gradually increases from the bending axis L towards the two non-folding regions 112. For example, a distance d8 between two adjacent openings O3 is greater than a distance d7 between another two adjacent openings O3 in FIG. 18.

Figure 19:
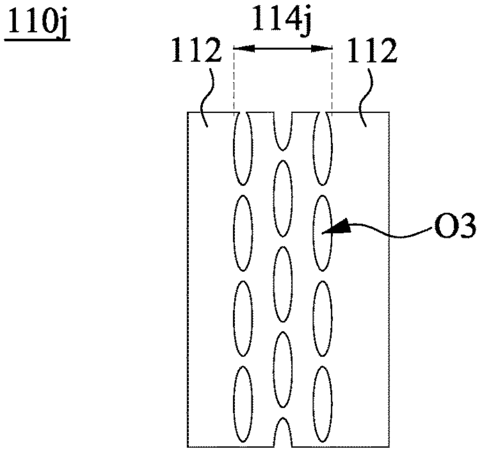
FIG. 19 depicts a top view of a supporting layer according to another embodiment of the present disclosure.

FIG. 19 depicts a top view of a supporting layer 110*j* according to another embodiment of the present disclosure. The supporting layer 110*j* has the two non-folding regions 112 and a folding region 114*j* between the two non-folding regions 112. A difference between the present embodiment and the embodiment of FIG. 15 lies in that the openings O3 in the folding region 114*j* are in a shape of an ellipse.

Figure 20:
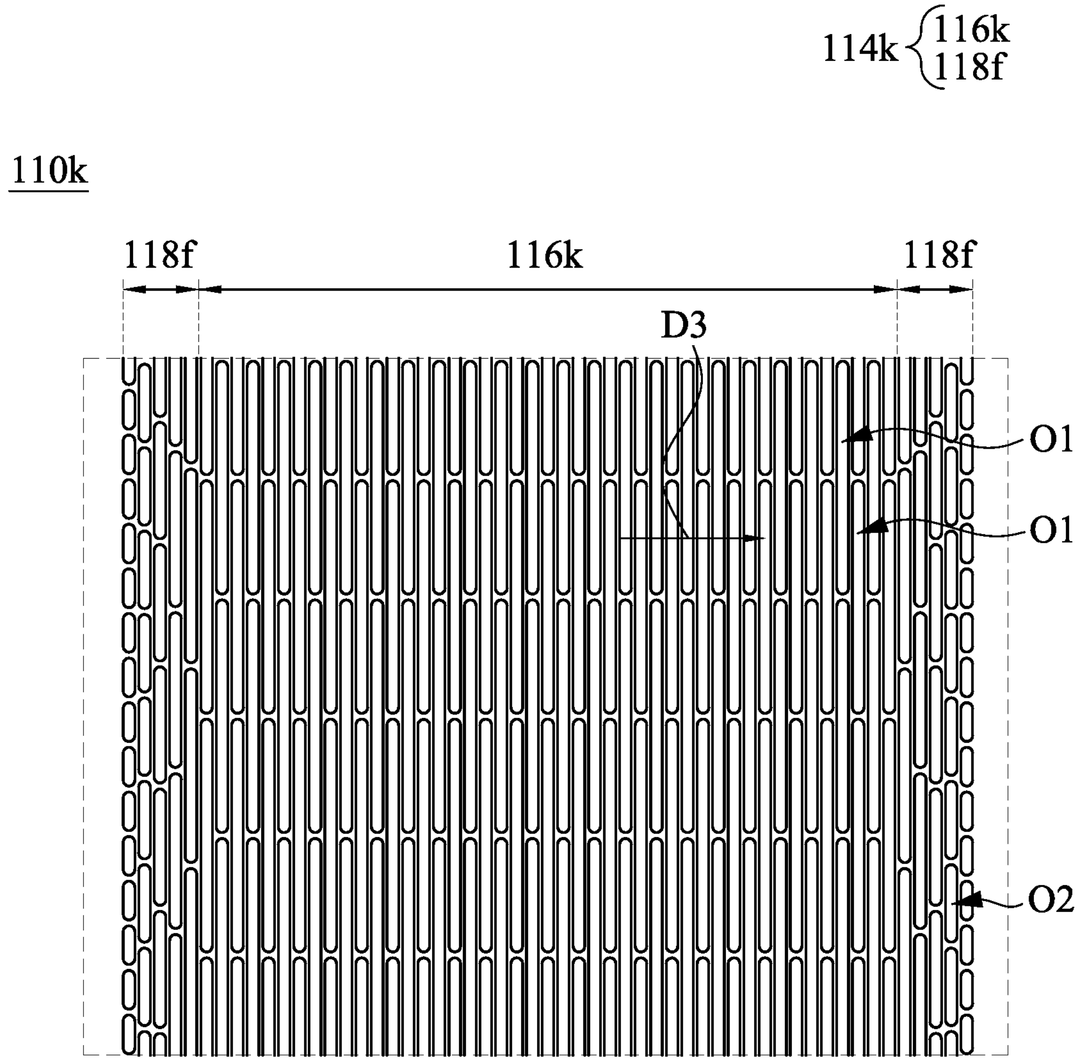
FIG. 20 depicts a partial enlarged view of a folding region of a supporting layer according to one embodiment of the present disclosure.

FIG. 20 depicts a partial enlarged view of a folding region 114*k* of a supporting layer 110*k* according to one embodiment of the present disclosure. The folding region 114*k* of the supporting layer 110*k* has a central region 116*k* and two edge regions 118*f*. The difference between this embodiment and the embodiment shown in FIG. 3 is that each of the first openings O1 is misaligned with the adjacent first opening O1 along a lengthwise direction D3 of the supporting layer 110*k*. That is, along the lengthwise direction D3 of the supporting layer 110*k*, end portions of the two adjacent first openings O1 are not aligned with each other.

Figure 21:
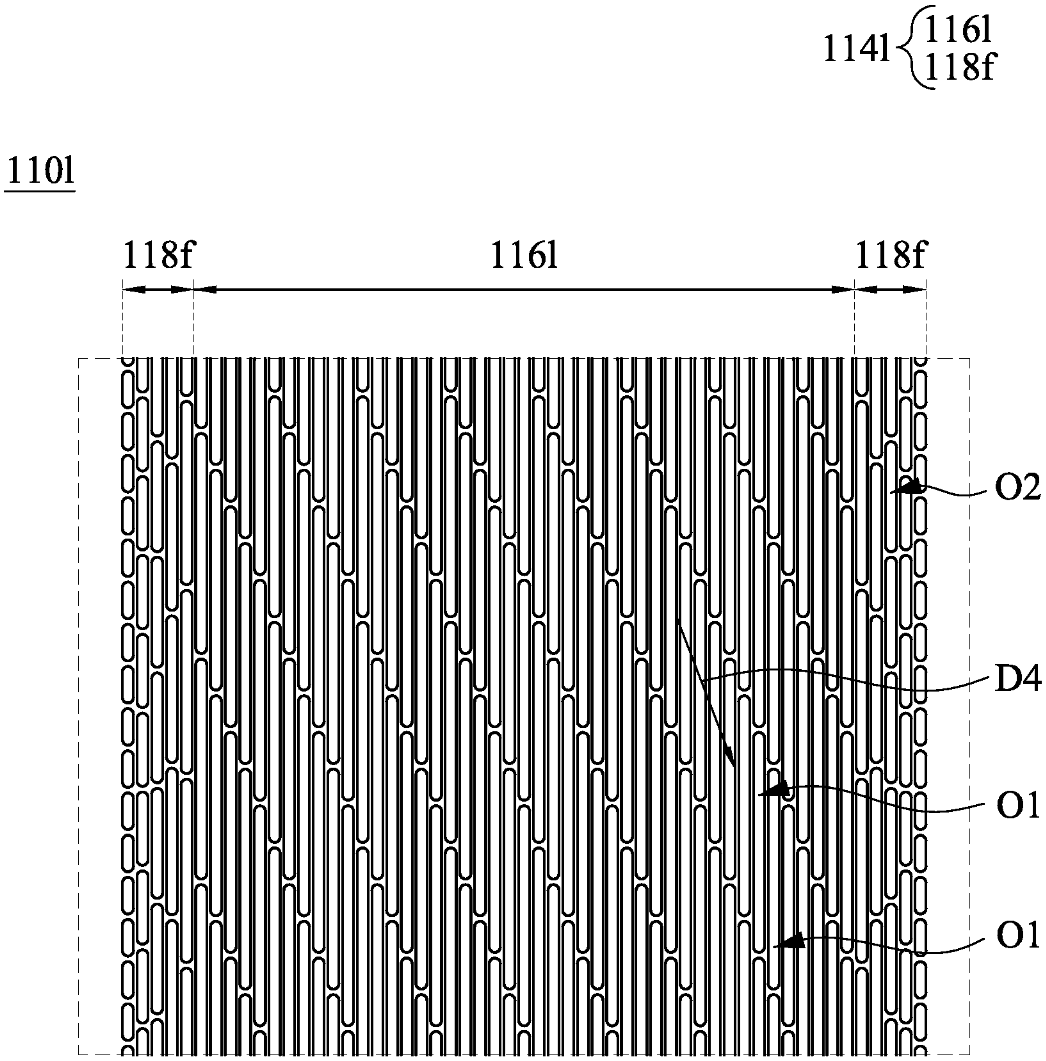
FIG. 21 depicts a partial enlarged view of a folding region of a supporting layer according to one embodiment of the present disclosure.

FIG. 21 depicts a partial enlarged view of a folding region 114*l* of a supporting layer 110*l* according to one embodiment of the present disclosure. The folding region 114*l* of the supporting layer 110*l* has a central region 116*l* and two edge regions 118*f*. The difference between this embodiment and the embodiment shown in FIG. 20 is that the first openings O1 are arranged in an oblique direction, such as a direction D4. The direction D4 may be defined by a connection line of the centers of the first openings O1.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A flexible display device comprising:

a supporting layer having two non-folding regions and a folding region between the two non-folding regions, wherein the folding region has a central region and two edge regions, each of the two edge regions is located between one of the two non-folding regions and the central region, and open porosities of the two edge regions are different from an open porosity of the central region, the central region has a plurality of first openings, each of the two edge regions has a plurality of second openings, the open porosities of the two edge regions gradually increase from the two non-folding regions towards the central region, the second openings are arranged in a plurality of columns in the two edge regions, each of the columns extends in a widthwise direction of the supporting layer, and the number of the second openings in each of the columns gradually increases from the central region to the two non-folding regions; and a flexible display panel located on the supporting layer.

2. The flexible display device of claim 1, wherein the open porosity of each of the two edge regions is less than the open porosity of the central region.

3. The flexible display device of claim 1, wherein a length of the second openings is smaller than a length of the first openings, and the length of the second openings gradually decreases from the central region towards one of the two non-folding regions.

4. The flexible display device of claim 1, wherein a width of the second openings is smaller than a width of the first openings, and the width of the second openings gradually decreases from the central region towards one of the two non-folding regions.

5. The flexible display device of claim 1, wherein a shape of the first openings is different from a shape of the second openings.

6. The flexible display device of claim 5, wherein the first openings are in a shape of a rectangle, and the second openings are is in a shape of a rhombus.

7. The flexible display device of claim 1, wherein a distance between two adjacent second openings in a direction is greater than a distance between two adjacent first opening in the direction, and the distance between the two adjacent second openings in the direction gradually increases from the central region towards one of the two non-folding regions.

8. The flexible display device of claim 7, wherein the folding region has a bending axis, and the direction is a direction perpendicular to the bending axis.

9. The flexible display device of claim 7, wherein the folding region has a bending axis, the direction is a direction parallel to the bending axis.

10. The flexible display device of claim 1, wherein the two non-folding regions have no opening.

11. The flexible display device of claim 1, wherein each of the first openings is misaligned with the adjacent first opening along a lengthwise direction of the supporting layer.

12. The flexible display device of claim 1, wherein the first openings are arranged in an oblique direction.

13. A flexible display device comprising:

a supporting layer having two non-folding regions and a folding region between the two non-folding regions, wherein the folding region has a bending axis and a plurality of openings, each of the openings has different sizes in a direction perpendicular to the bending axis, open porosities of two edge regions of the folding region gradually increase from the two non-folding regions towards a central region of the folding region, the openings are arranged in a plurality of columns in the two edge regions, each of the columns extends in a widthwise direction of the supporting layer, and the number of the openings in each of the columns gradually increases from the central region to the two non-folding regions; and a flexible display panel located on the supporting layer.

* * * * *